US010766552B2

United States Patent
Keiller

(10) Patent No.: US 10,766,552 B2
(45) Date of Patent: Sep. 8, 2020

(54) STAND FOR A BICYCLE OR FOR A BICYCLE FRAME

(71) Applicant: Canyon Bicycles GmbH, Koblenz (DE)

(72) Inventor: John Keiller, Manchester (GB)

(73) Assignee: Canyon Bicycles GmbH, Koblenz (DE)

( * ) Notice: Subject to any disclaimer, the term of this patent is extended or adjusted under 35 U.S.C. 154(b) by 167 days.

(21) Appl. No.: 15/904,957

(22) Filed: Feb. 26, 2018

(65) Prior Publication Data

US 2018/0251175 A1    Sep. 6, 2018

(30) Foreign Application Priority Data

Mar. 1, 2017 (DE) .................. 20 2017 001 043 U

(51) Int. Cl.
| | | |
|---|---|---|
| *B62H 3/10* | (2006.01) | |
| *B65D 85/68* | (2006.01) | |
| *B62H 3/00* | (2006.01) | |
| *B25H 1/00* | (2006.01) | |

(52) U.S. Cl.
CPC ............. *B62H 3/10* (2013.01); *B25H 1/0014* (2013.01); *B62H 3/00* (2013.01); *B65D 85/68* (2013.01); *B65D 2585/6862* (2013.01)

(58) Field of Classification Search
CPC ... B62H 3/00; B62H 3/04; B62H 3/06; B62H 3/08; B62H 3/10; B62H 1/00; B62H 1/02; B62H 1/04; B62H 1/08; B25H 1/0014; B65D 85/68
See application file for complete search history.

(56) References Cited

U.S. PATENT DOCUMENTS

| | | | | |
|---|---|---|---|---|
| 292,163 | A * | 1/1884 | Fry ......................... | B62H 3/04 211/21 |
| 431,740 | A * | 7/1890 | Curtis ...................... | B62H 3/00 211/22 |
| 518,325 | A * | 4/1894 | Mueller ................... | B62H 3/00 211/22 |
| 537,583 | A * | 4/1895 | Reid ........................ | B62H 3/00 211/22 |
| 556,758 | A * | 3/1896 | Lefebre ................... | B62H 3/08 211/22 |

(Continued)

FOREIGN PATENT DOCUMENTS

| | | |
|---|---|---|
| AT | 516013 A1 | 1/2016 |
| CN | 201432741 Y | 3/2010 |

(Continued)

OTHER PUBLICATIONS

Zinniker, Alan "Review: Feedback Sports' Euro-Style Sprint Work Stand", Cyclocross Magazine, May 22, 2013, www.cxmagazine.com, Retrieved from Internet on Aug. 13, 2019.

*Primary Examiner* — Tony H Winner
*Assistant Examiner* — Conan D Duda
(74) *Attorney, Agent, or Firm* — The Webb Law Firm

(57) ABSTRACT

A bicycle and bicycle frame stand includes a first leg element and a second leg element which forms an angle of less than or equal to 90° with the first leg element. The second leg element has a bicycle receiving element for a bicycle component of an assembled bicycle, and the second leg element has a frame receiving element for a bicycle frame component.

8 Claims, 2 Drawing Sheets

(56) References Cited

U.S. PATENT DOCUMENTS

| | | | | |
|---|---|---|---|---|
| 574,628 | A * | 1/1897 | Phillips | B62H 3/00 211/22 |
| 576,002 | A * | 1/1897 | Terrell | B62H 3/00 211/22 |
| 588,376 | A * | 8/1897 | Banker | B62H 3/12 211/17 |
| 590,769 | A * | 9/1897 | Pearsons | B62H 3/00 211/22 |
| 591,969 | A * | 10/1897 | Hiekisch | B62H 3/00 211/22 |
| 592,534 | A * | 10/1897 | Webster | B62H 3/00 211/22 |
| 603,422 | A * | 5/1898 | Burkhardt | B62H 3/00 211/22 |
| 2,803,349 | A * | 8/1957 | Talbot | B62H 3/00 211/22 |
| 3,125,341 | A * | 3/1964 | Carrington | A63B 69/16 482/61 |
| 3,572,758 | A * | 3/1971 | Lee | A63B 69/16 280/296 |
| 3,931,991 | A * | 1/1976 | Marchello | B62H 3/10 280/295 |
| 4,792,039 | A * | 12/1988 | Dayton | A45C 5/14 206/304 |
| 4,842,148 | A * | 6/1989 | Bowman | B60R 9/048 211/17 |
| 4,892,190 | A * | 1/1990 | Delgado | B62J 99/00 206/304 |
| 5,320,227 | A * | 6/1994 | Minoura | B25H 1/0014 211/22 |
| 5,497,967 | A * | 3/1996 | Gantois | B25H 1/0014 211/22 |
| 5,669,497 | A * | 9/1997 | Evans | B65D 85/68 206/335 |
| 6,257,419 | B1 * | 7/2001 | Kamysiak | B62H 3/00 211/22 |
| 8,851,301 | B1 * | 10/2014 | Ho | B62H 3/04 211/20 |
| 10,329,083 | B1 * | 6/2019 | Chuang | B65D 85/68 |
| 2004/0088845 | A1 * | 5/2004 | Winkenbach | B25H 1/0014 29/281.5 |
| 2005/0199561 | A1 * | 9/2005 | Dansie | B25H 1/0014 211/22 |
| 2009/0189135 | A1 * | 7/2009 | Van Der Westhuizen | B25H 1/0014 254/93 H |
| 2010/0122958 | A1 * | 5/2010 | Tsai | B62H 3/04 211/22 |
| 2012/0119427 | A1 * | 5/2012 | Weissenborn | A63C 11/04 269/95 |
| 2014/0182756 | A1 * | 7/2014 | Nicholson | B62J 19/00 150/166 |
| 2015/0266664 | A1 * | 9/2015 | Noer | A45C 5/14 206/216 |
| 2017/0001673 | A1 * | 1/2017 | McGriskin | B25H 1/0014 |
| 2017/0066588 | A1 * | 3/2017 | Schreiber | F16B 2/08 |

FOREIGN PATENT DOCUMENTS

| | | |
|---|---|---|
| DE | 29614962 U1 | 10/1996 |
| DE | 29915302 U1 | 1/2000 |
| DE | 10019542 A1 | 11/2000 |
| DE | 20215980 U1 | 1/2003 |
| DE | 20212053 U1 | 2/2003 |
| DE | 10360822 A1 | 7/2005 |
| DE | 202013102637 U1 | 8/2013 |
| EP | 0692346 A1 | 1/1996 |
| EP | 2505463 A1 | 10/2012 |
| JP | 2013043596 A | 3/2013 |

* cited by examiner

STAND FOR A BICYCLE OR FOR A BICYCLE FRAME

CROSS-REFERENCE TO RELATED APPLICATION

This application claims priority to German Patent Application No. 20 2017 001 043.7 filed Mar. 1, 2017, the disclosure of which is hereby incorporated in its entirety by reference.

BACKGROUND OF THE INVENTION

Field of the Invention

The invention relates to a bicycle stand, as well as to a bicycle frame stand. The invention further relates to a transport container for bicycle frames.

Description of Related Art

Bicycle stands not connected with a bicycle frame are known for supporting or parking bicycles. These are essentially L-shaped in cross section, wherein one leg element stands on the ground and the other leg element protrudes essentially vertically upward. The upward protruding leg element comprises a bicycle receiving element which may be connected with the bicycle. In particular, the bicycle receiving element is configured as a slot open to the top into which the rear wheel axle can be inserted from above. The leg element standing on the ground is conventionally arranged such that the rear wheel stands on this leg element.

SUMMARY OF THE INVENTION

It is an object of the present invention to improve the usability of a bicycle stand.

The object is achieved with a bicycle and bicycle frame stand, as well as a transport container for bicycle frames.

The bicycle and bicycle frame stand of the present invention, hereinafter referred to as a stand, comprises a first and a second leg element. The two leg elements are preferably arranged relative to each other or connected with each other such that they are substantially L-shaped in cross section or in side view. In particular, the two leg elements include an angle of 90°.

The first leg element comprises a bicycle receiving element for receiving a bicycle component of an assembled bicycle. Here, the bicycle receiving element may be designed as a slot open to one side, so that e.g. a rear axle, a chain stay, or the like, can be inserted into the slot-shaped bicycle receiving element from above.

According to the invention, the second leg element comprises a frame receiving element for a bicycle frame component. Thus, it is possible to also fix a bicycle frame to which no rear wheel or other components are mounted. In particular, when the stand is used as a bicycle frame stand, the first leg is placed on the ground or another support, so that the second leg protrudes in particular upward. The bicycle and bicycle frame stand of the present invention thus has a double function, i.e. the secure support of an entire bicycle or of a bicycle frame.

The frame receiving element is preferably designed such that it is suited for connecting at least one of the two dropout ends of a bicycle frame. To guarantee a secure support and especially a secure stand, it is particularly preferred that the frame receiving element is designed such that it can be connected with both dropout ends, in particular of a rear frame structure of a bicycle frame. Here, it is particularly preferred that the frame receiving element comprises n in particular cylindrical opening so that a fixing element can be received therethrough. Here, e.g. in case of a fixation by a chain stay or the like, a Velcro tape or another fastener element may be provided as the fixing element. It is particularly preferred to provide a bar-shaped element as the fixing element, the bar-shaped element corresponding to a bicycle axle. This bicycle axle may then be inserted through the cylindrical openings and the openings in the region of the dropout ends. Here, it is particularly preferred that a quick release hub axle is provided as the fixing element.

In a particularly preferred embodiment of the bicycle and bicycle frame stand, the frame receiving element is designed such that it is arranged for the fixation of a bicycle frame between the dropout ends of the bicycle frame. In this case, the frame receiving element is arranged in the region of the rear wheel hub. The fixation is then again effected using a quick release hub axle.

Especially, if it serves to be positioned between the two dropout ends of the frame, the frame receiving element is designed such that it has a length of ca. 14-18 cm, in particular 15-17 cm. The opening, through which the fixing element which is configured in particular as a quick release hub axle can be inserted, is provided in the longitudinal direction of a frame receiving element designed in such a manner.

The frame receiving element is preferably formed integrally with the second leg element or is at least fixedly connected therewith.

When using the stand as a bicycle frame stand, the first leg element serves as a ground contact element. The same may be used e.g. for presentation purposes in bicycle shops.

When using the stand as a bicycle stand, however, the second leg serves as the ground contact element. In this case, the conventional use may e.g. be used for the presentation of an entire bicycle or also for storing the bicycle, for mounting or adjusting components o the bicycle etc.

The invention further refers to a bicycle frame transport container. Such a transport container is, in particular, a cardboard box in which the bicycle frame can be shipped by a transport company, and the like. The bicycle frame transport container comprises an outer container inside of which the bicycle frame is arranged. Of course, further components of a complete bicycle can be arranged in the outer box as well. In particular, it is possible to additionally provide the handlebar, the wheels and other mounting parts in the outer box. According to the invention, the above described bicycle frame stand is arranged in the bicycle frame transport container. The stand is connected with the rear frame of the bicycle frame to be transported, whereby it is securely held. Using the bicycle frame stand inside a transport box has the advantage that the bicycle frame is securely and reliably held thereby in the transport box and that the risk of damage during transport is significantly reduced. Here, the bicycle frame stand is developed in an advantageous manner, as described above.

In addition, a fork fixing element may be arranged in the outer container. This is advantageous if the fork is already mounted to the bicycle frame, so that in particular the fork tubes can be held and fixed in the fork fixing element.

The invention will be described in more detail hereinafter with reference to a preferred embodiment with reference to the drawings.

DESCRIPTION OF THE INVENTION

The bicycle and bicycle frame stand, hereinafter referred to as a stand, has a first leg 10 and a second leg 12. Both legs 10, 12 are fixedly connected with each other, in particular formed integrally. In particular, the stand is a bent sheet metal part. In the embodiment illustrated, an angle α (FIG. 2) between the first and the second leg 10, 12 is slightly smaller than 90°.

Figure 1:
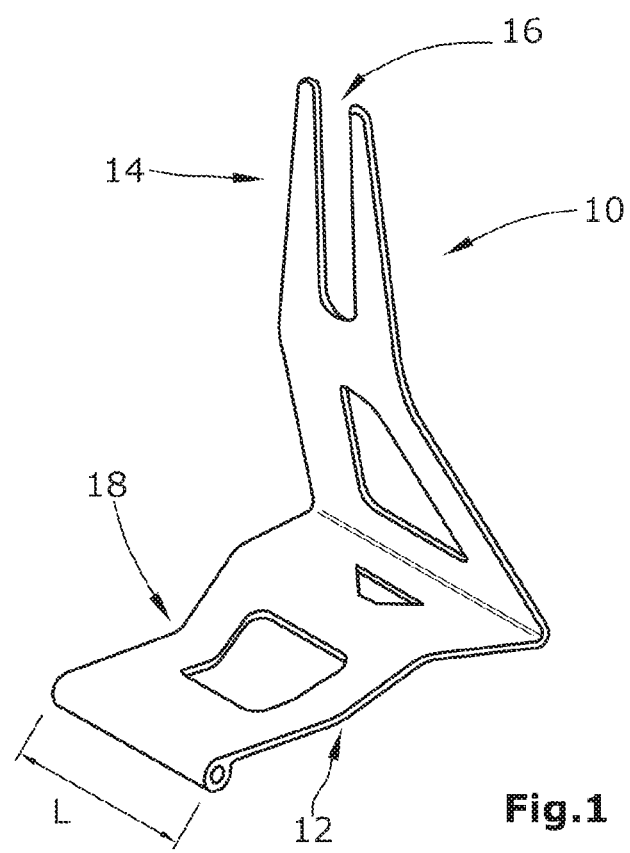
FIG. 1 is a schematic perspective view of the bicycle and bicycle frame stand.
Figure 2:
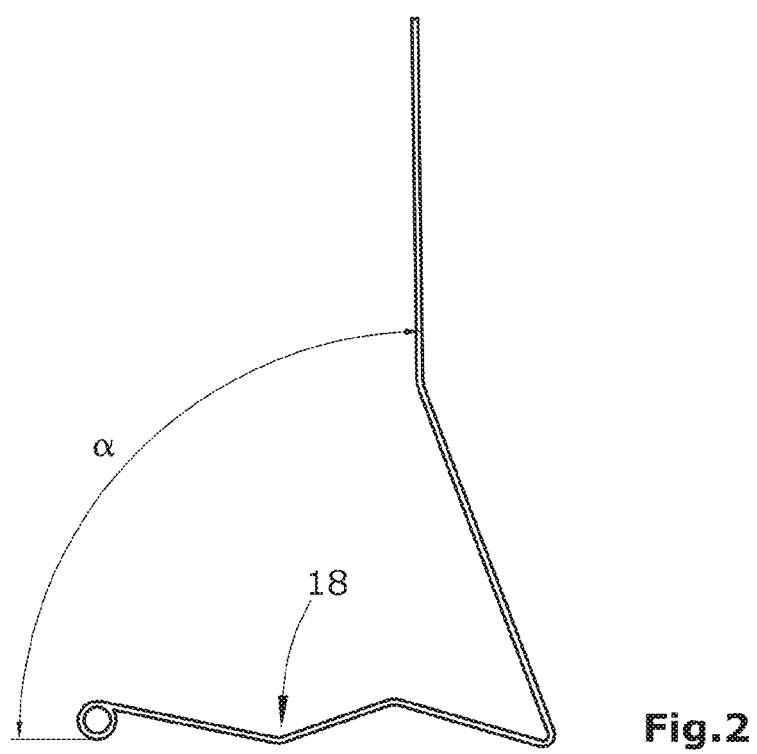
FIG. 2 is a schematic side view of the bicycle and bicycle frame stand in its arrangement for use as a bicycle stand.

In FIGS. 1 and 2, the stand is in a position in which it can be used as a bicycle stand. In this position, the second leg element 12 serves as the ground contact element which stands e.g. on an in particular horizontal ground or the like. The first leg element 10 comprises a bicycle receiving element 14 which in the embodiment illustrated is slot-shaped. The bicycle receiving element 14 has an opening 16 directed to the outer side of the first leg element 10, which opening thus being directed upward in the position illustrated in FIGS. 1 and 2. A rear wheel axle or the head of a quick release hub axle can be inserted from above into the opening 16 in the slot-shaped bicycle receiving element 14. The tire of a rear wheel is arranged in a groove or indentation 18 of the second leg element 12 so that the weight of the bicycle rests on the second leg element 12.

Figure 3:
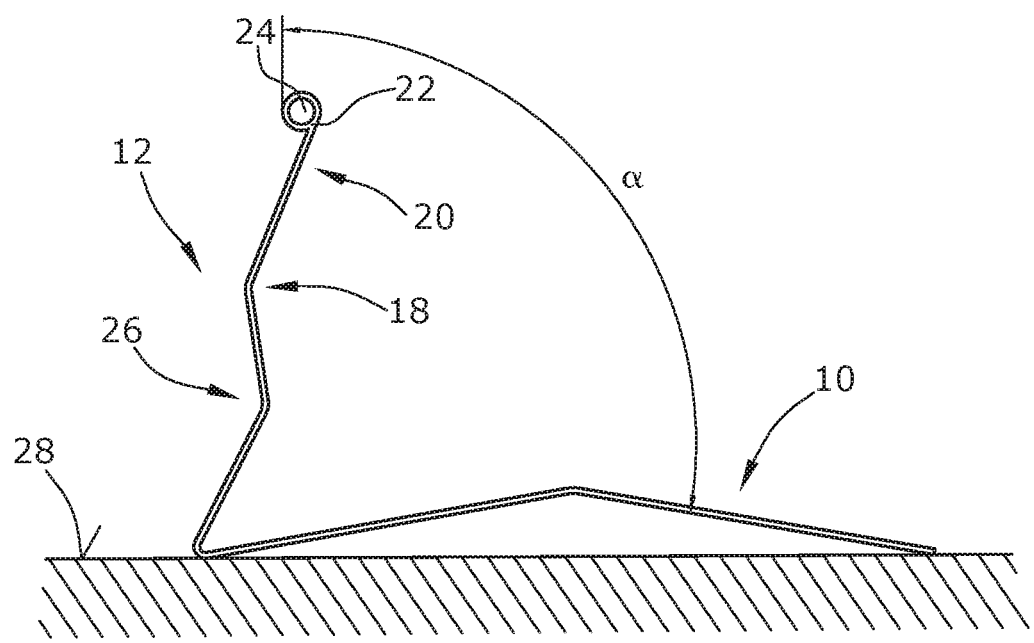
FIG. 3 is a side view of the bicycle and bicycle frame stand in its arrangement for use as a frame stand, and FIG. 4 a schematic side view of a partially cut bicycle frame transport container.

The second leg element 12 has a frame receiving element 22 at its outer or remote end 20 which is directed upward In use as a bicycle frame stand (FIG. 3). The frame receiving element 22 has a cylindrical opening 24. The same extends over the entire length L (FIG. 1) of the frame receiving element 22.

In addition to the groove or indentation 18 the second leg element 12 has another indentation or groove 26 provided on the opposite side of the second leg element 12 for an increase in stability. Thus, in side view, the second leg element is slightly Z- or S-shaped.

For supporting a bicycle frame, the first leg element 10 rests e.g. on upper side 28 of a ground (FIG. 3).

Figure 4:
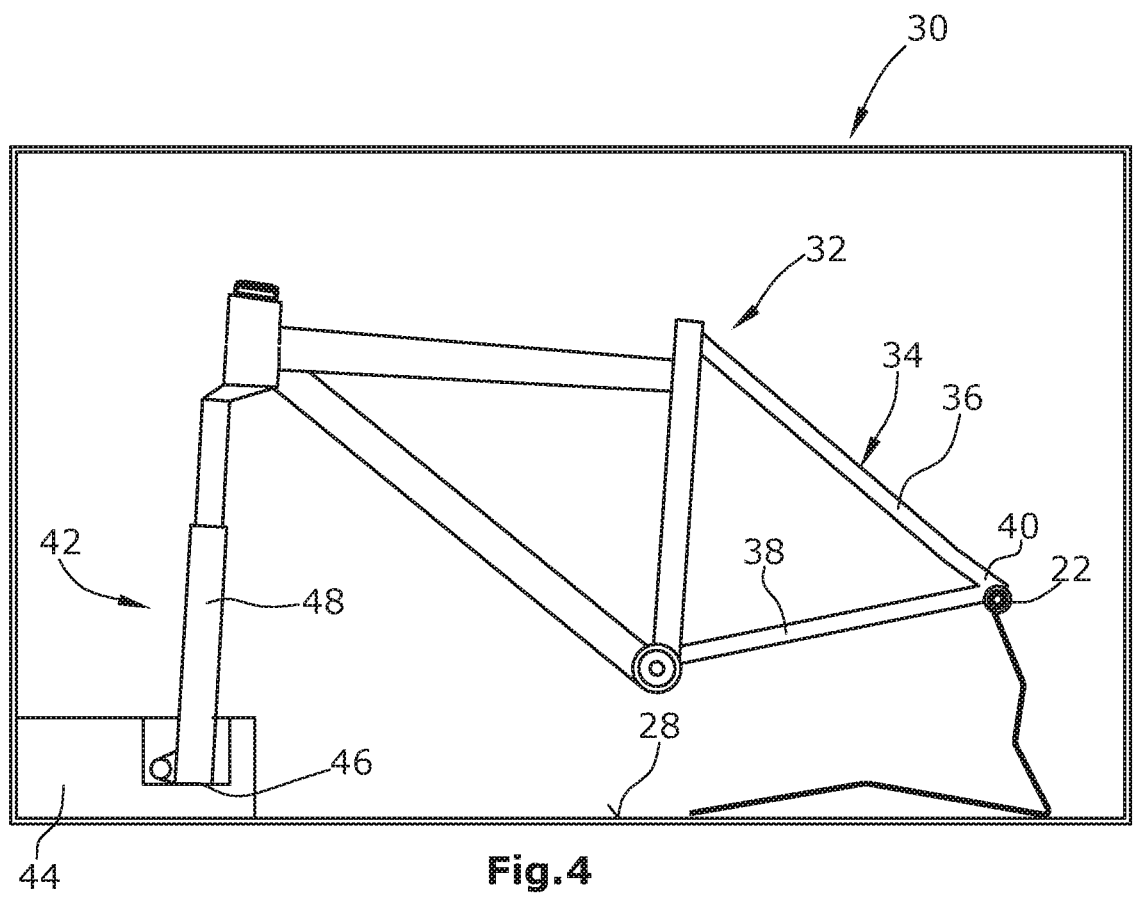

It is particularly preferred to use the frame stand in a bicycle frame transport container as schematically illustrated in FIG. 4. Here, the first leg element 10 rests on the bottom 28 of a frame transport container 30. The frame transport container 30, made in particular of cardboard, is of cuboid shape when seen from the outside, the front side wall not being illustrated in FIG. 4 so that the bicycle frame 32 arranged inside is visible. The bicycle frame 32 has a rear frame 34. The bicycle frame 32 is provided with two dropouts 40 in the region where the seat stays 36 and the chain stays 38 merge. The frame receiving element 22 of the frame stand is arranged between the two dropouts 40 in a manner corresponding to a bicycle hub. A quick release hub axle, which is not illustrated, is passed through the dropouts 40 and the opening 24 of the frame receiving element 22 and is fixed appropriately. Thereby, a rigid connection of the dropouts 40 of the frame 32 with the frame stand is guaranteed. Thus, in the region of the rear frame 34, the frame 32 is securely arranged in the frame transport container 30.

A fork fixing element 44 is arranged on the bottom 28 of the bicycle frame transport container in the region of a bicycle fork 42 of the bicycle frame 32. The element may e.g. comprise recesses 46 in which the dropouts of the two fork tubes 48 can be fixed.

In addition, it is possible to also arrange e.g. the handlebar, the seat and other mounting parts in the bicycle transport container 30. For this purpose, additional receiving boxes or other receptacles can be arranged in the bicycle frame container 30. Optionally, however, the bicycle frame is shipped without further mounting parts or, possibly, with only some of the mounting parts, such as the seat post and the handlebar.

The invention claimed is:

1. A stand for a bicycle and or bicycle frame stand comprising:
    a first leg element,
    a second leg element which forms an angle of less than or equal to 90° with the first leg element,
    wherein the first leg element has a terminal end spaced from and opposite the second leg element, the terminal end comprises a slot-shaped bicycle receiving element for a bicycle component of the bicycle, the slot-shaped bicycle receiving element having an opening directed to an outer side of the first leg element for receiving the bicycle component,
    wherein the second leg element has a frame receiving element for a bicycle frame component, the frame receiving element having a cylindrical opening for receiving a fixing element,
    wherein the frame receiving element is configured for connection with rear dropouts of the bicycle frame,
    wherein the first leg element serves as a ground contact element when the stand is in a first position,
    wherein the second leg element serves as the ground contact element when the stand is in a second position, and
    wherein, in the first position, at least a portion of the terminal end including the slot-shaped bicycle receiving element is in direct contact with the ground and, in the second position, the terminal end including the slot-shaped bicycle receiving element is spaced from the ground and is configured to receive the bicycle component.

2. The stand of claim 1, wherein the frame receiving element is configured to be arranged between two rear dropouts of the bicycle frame for fixation of the bicycle frame.

3. The stand of claim 1, wherein the frame receiving element has a length of 14-18 cm, and the cylindrical opening extends in the longitudinal direction.

4. The stand of claim 1, wherein the frame receiving element is fixedly connected with the second leg element.

5. A bicycle frame transport container comprising:
    an outer container and the bicycle frame stand of claim 1 arranged in the outer container.

6. The bicycle frame transport container of claim 5, comprising a fork fixing element arranged in the outer container.

7. The stand of claim 3, wherein the frame receiving element has a length of 15-17 cm.

8. The stand of claim 4, wherein the frame receiving element is integrally formed with the second leg element.

* * * * *

UNITED STATES PATENT AND TRADEMARK OFFICE
CERTIFICATE OF CORRECTION

| | |
|---|---|
| PATENT NO. | : 10,766,552 B2 |
| APPLICATION NO. | : 15/904957 |
| DATED | : September 8, 2020 |
| INVENTOR(S) | : John Keiller, Byrn Daniel Morgan and Henry Alexander James |

It is certified that error appears in the above-identified patent and that said Letters Patent is hereby corrected as shown below:

On the Title Page

Item (12), delete "Keiller" and insert --Keiller et al.--

Inventor(s), Lines 2-3, insert --Bryn Daniel Morgan, Arnside (GB)-- and --Henry Alexander James, Manchester (GB)--

Signed and Sealed this
Twelfth Day of September, 2023

Katherine Kelly Vidal
*Director of the United States Patent and Trademark Office*